Patented Dec. 26, 1922.

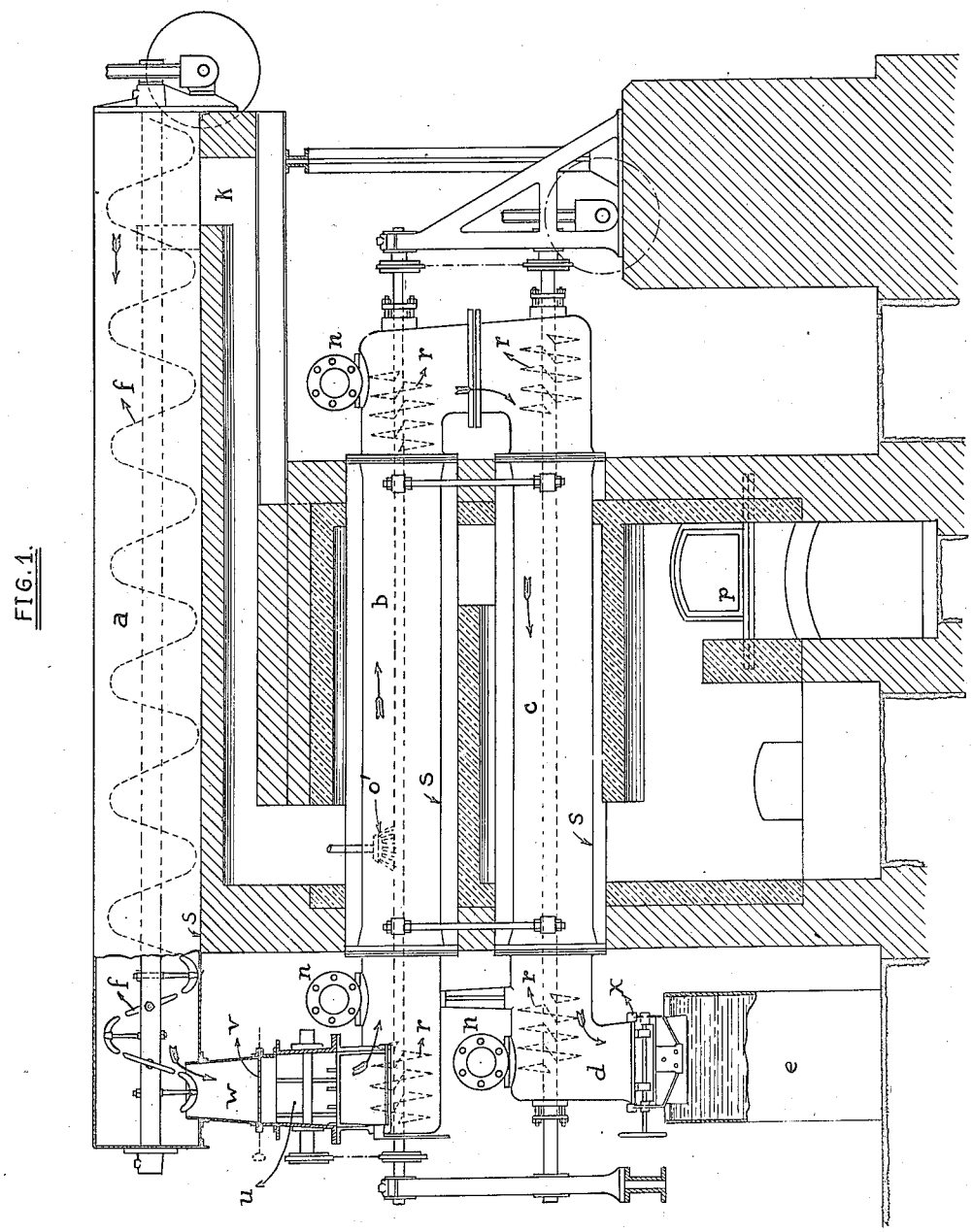

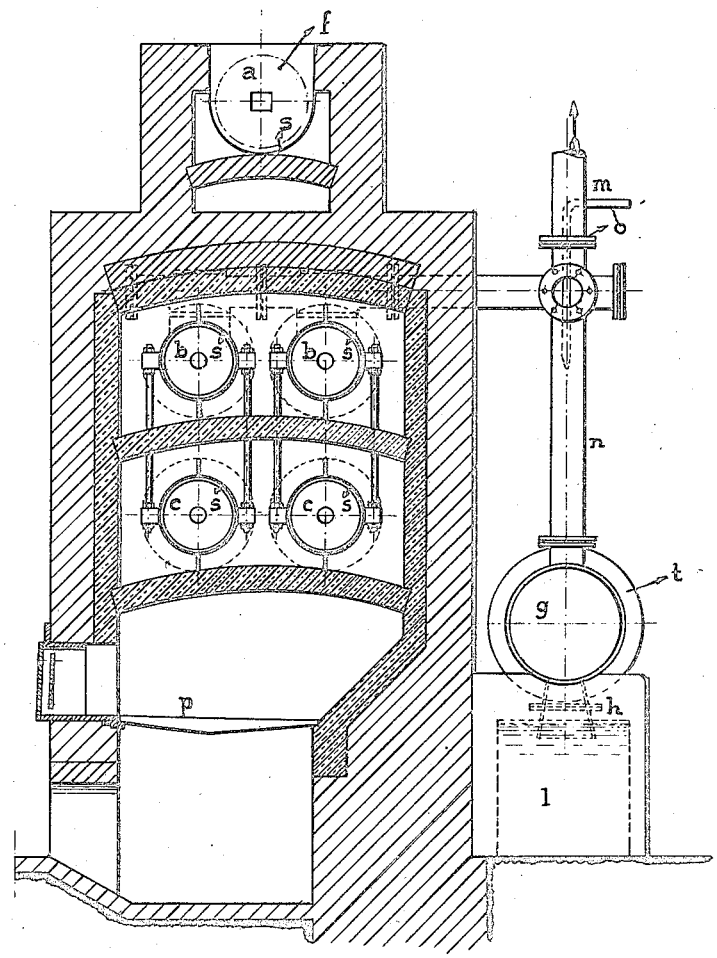
FIG: 2

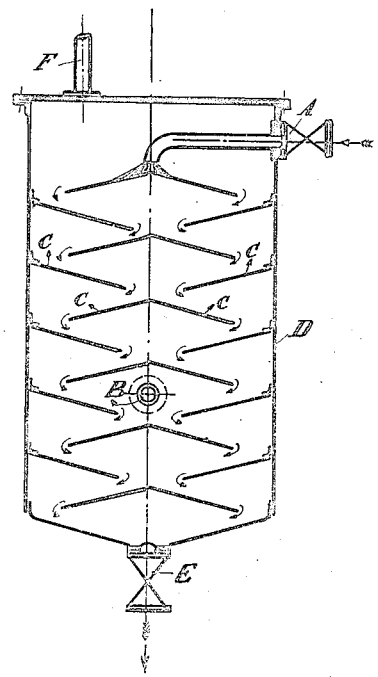

1,440,194

UNITED STATES PATENT OFFICE.

ABRAHAM WIJNBERG, OF AMSTERDAM, NETHERLANDS, ASSIGNOR TO GENERAL NORIT COMPANY, LIMITED, OF AMSTERDAM, NETHERLANDS, A CORPORATION OF HOLLAND.

METHOD OF DRYING, BURNING, AND RECOVERING FINELY-DIVIDED MATERIAL.

Application filed November 16, 1917. Serial No. 202,435.

(GRANTED UNDER THE PROVISIONS OF THE ACT OF MARCH 3, 1921, 41 STAT. L., 1313.)

*To all whom it may concern:*

Be it known that Dr. ABRAHAM WIJNBERG, diplomated technologe, teacher at the School for Sugar Industry, subject of the Queen of the Netherlands, residing at 567 Heerengracht, Amsterdam, Kingdom of the Netherlands, has invented certain new and useful Improvements in a Method of Drying, Burning, and Recovering Finely-Divided Material (for which I have filed applications in Germany, February 25, 1916, and April 25, 1916, Patent No. 297,345; Austria, filed March 2, 1916, Patent No. 77,577; Hungary, filed March 7, 1916, Patent No. 70,419; Netherlands, filed March 12, 1916, application No. 6838, and April 12, 1916, Patent No. 4575; Great Britain, filed July 18, 1916, Patent No. 104,456; Switzerland, filed October 7, 1916, Patent No. 75,447; Sweden, July 16, 1917, Patent No. 49,464; Norway, July 25, 1917, Patent No. 29,647), of which the following is a specification.

The object of my present invention is to provide an improved method of drying, burning and recovering in a pure form, finely divided materials, and particularly for regenerating finely divided materials, such as bone char or decolorizing carbon, which have been used for the purification or filtration of liquors or liquids. When such finely divided material is treated, it presents certain difficulties on account of forming a very dense and practically impervious mass, whereas granular materials are of a relatively loose character and therefore can be dried, burned, and otherwise treated much more readily than finely powdered substances. These latter substances oppose a considerable resistance to the escape of gases or vapors formed during the treatment, and furthermore cannot be fed merely by gravity (as granular substances can), and also are difficult to heat and burn uniformly. The result is that, if finely divided materials are burned in the same manner which has been customary for granular materials, a very imperfect action is obtained, that is, in the case of regeneration, only a relatively small portion (as compared with the theoretical possibilities) of the material is recovered in serviceable form; moreover, there is considerable danger of explosion owing to the retention of a portion of the gases or vapors.

In order to recover practically all the substance under treatment, I subject such material to a gradually increasing heat, in stages, preferably first in a vessel open to the air (for the escape of some of the moisture during the drying operation which takes place at a moderate temperature), and then under practical exclusion of air, at a higher temperature. The gases and vapors developed during this second (burning) stage are carried away, together with the particles of material suspended in, and enveloped by, such gases and vapors, and by a subsequent condensation of the condensible gases and vapors the materials contained therein are thrown down and recovered, whereas they would be lost if the gases and vapors were allowed to escape without any further treatment.

It will be understood that my method is applied to the teatment of finely divided materials, either of a carbonaceous character (to be brought or restored to a state of great purity by the burning operation), or substances containing no carbon in themselves (say, kieselguhr or fuller's earth), and subjected to the treatment for the removal of impurities.

By the term "finely divided material" I wish to designate in general, materials of a very small size, e. g. such materials of which a great part, say 25%, can pass in dry state through a sieve with meshes of a size of two mm. square.

I wish it, however, to be understood that I do not limit myself to any particular fineness.

The meaning of the term "burning or reburning" as it is used in this specification should be understood to mean: for carbons or carbonaceous matter, burning under practical exclusion of air or in the presence of indifferent or other suitable gases so as to avoid great losses of the material through oxidation, while for other materials which do not contain carbon or carbonaceous matter which has necessarily to be left in existence, the burning may be done in the presence of air or even of more oxidizing gases.

An apparatus suitable for carrying out my invention is represented in the annexed drawing, in which Fig. 1 represents a longitudinal section, and Fig. 2 a cross section of the same; Fig. 3 is a vertical section of a condenser.

Of the two apparatuses mentioned herein before, the first, serving for burning the material to be treated, is composed of the following parts:—

Of a drying shoot or open conveyor (a) provided with arms (f), of burning tubes or retorts (b and c) provided with screw conveyors (rr) suitably connected with each other; of a collector (e). The arms (f) and screws (rr) of the conveyor (a) and of the retorts (b and c) respectively serve to carry forward mechanically the material to be dried and burned, first through the open conveyor (a) in which e. g. the decolorizing carbon is partly dried, then through the upper tubes or upper retorts (b) where it is further dried and then burned, thence through the lower tubes (c) where the burning is continued, and further until it reaches the far end of the lower reburning tubes, where it drops at d into a closed or open receptacle (e) filled with a suitable liquid, for instance water.

The screws (rr) and arms (f) above mentioned also serve to mechanically subject all particles of the material to be treated to an equal and intimate action of the applied heat, by mixing the said material while conveying it forward, and by spreading it gradually and continuously in a thin layer over the inner surface of the heated walls (s) of the drying conveyor (a) and of the burning tubes or retorts (b and c). By keeping the finely divided material spread in a thin layer over the inside of the burning retorts the gases and vapors formed are enabled to escape freely and easily and explosions are thus avoided.

A free escape is afforded to the steam or vapors evolved from the moist material as it travels along the conveyor trough or drier (a). The heat applied is gradually increased in intensity; it is the lowest where the material under treatment is subjected to drying only, viz. in the conveyor (a), higher in the upper retort (b) and highest under the lower retort (c). A suitable temperature is about 600° centigrade under retort (c) while in the conveyor (a) it is about 200° to 400° centigrade. The temperature to be applied may be greatly varied and depends on the material to be treated, on the object aimed at, on the results which are desired, etc., and also upon the materials of which the drying and burning retorts are made, namely whether or not these could stand the temperature to be applied.

For conveying the material to be dried and burned any other suitable kind of mechanical means than described above and shown in the annexed drawings, and made of any suitable material may be used.

The retorts (b and c) especially the lower retorts (c) if made of cast iron, may be protected by a suitable lining or otherwise against direct contact with the flames, in order to avoid burning or otherwise injuring the iron tubes.

During the burning and drying, in the open conveyor (a) and also in the closed retorts of the burning kilns (b and c) gases are formed from the destruction of organic matter by the heat applied, and vapors from forming of steam out of the moisture present in the dried and burned material.

These gases and vapors carry away, as already mentioned, considerable amounts of the material to be burned, in fact, the most of the lighter parts of the same, while the heavier particles of the said material are carried forward by the screws (rr) of the retorts (b and c) to the receptacle (e) at the end of the lower reburning retorts (c).

The second of the two apparatuses mentioned above, consists of one or more pipes or tubes (n) suitably arranged, serving to carry off the gases and vapors developed by and during the drying and burning process; the said apparatus further consists of the so-called condenser (g) to which the said gases and vapors are conducted; of the collector (l) and the pipe (m). By cooling the outer walls (t) of the condenser by exposure to the open air or by the use of cold water sprayed into or upon the condenser drum, the condensible gases and the steam vapors developed during the drying and burning process are condensed, and this condensation causes the envelopment and precipitation of the material suspended in the said gases and vapors. The condenser also serves to collect the precipitated particles of the treated material recovered by the said condensation process. As a result of the condensation the recovered material is obtained partly as a thick and partly as a thin paste. The thick paste of the recovered material is collected by cleaning out the condenser (g), while the thin paste is collected by conducting it through an opening (h) in the bottom of the condenser to either a closed or a water sealed receptacle (l).

Any kind of suitable closed or open receptacle which may be made of any suitable material, may be used for collecting the particles of the treated material, coming either from the lower reburning tube or retort of the kiln or from the condenser.

Closed receptacles, filled with an indifferent gas, may be used, or open receptacles filled with water or any other suitable liquid or like substance, the idea being only to avoid the oxidation of the burned hot carbon or carbonaceous matter—provided the treated material contain such—through cantact with or exposure to the open air.

The connections effected by the pipes (n) made for instance of cast iron may also be carried out in any other suitable way and and by any other suitable means, using any other suitable materials. The pipe (m), which is placed above the condenser (g) and made of steel serves to conduct to the open air the non-condensible gases and those condensible gases and steam vapors which have escaped condensation. This pipe (m) may also be made of any other suitable material.

The general process of burning and drying when working the combination of the two systems as shown in the appended drawing may be described as follows:—

The material to be burned or to be regenerated through burning is continuously conveyed by the open screw-conveyor (a) where it is partly dried, to a feed funnel (w) provided with a breaker (u), say a rotary breaker of customary type, to break big cakes if any, and also provided with a valve (v), preferably a slide valve or damper, to shut off the air from the reburning kilns (b and c) when the burning or reburning is to be discontinued or stopped. The said funnel (w) leads the partly dried material continuously to the reburning tubes or retorts proper (b and c) which are provided with screw-conveyors (rr). The drying conveyor (a) and the reburning tubes or retorts (b) and (c) which may be made in any suitable form and of any suitable material, for instance cast iron, graphite, fire-clay, silicate, etc., and may be open or closed, are provided with arms or screws or with any other suitable mechanical means to convey the material to be burned towards the collecting receptacle (e).

The feed funnel (w) which is preferably small at the top and wide at the bottom, may be provided with other feeding means, instead of a breaker.

In some cases, if the material to be treated is rather wet or sticky, it is of great advantage to have the said screw conveyor in the upper retort partly or wholly replaced by conveying arms such as are used in the drying shoot (a) or by other suitable means of conveying.

The burned or reburned material is continuously conveyed through the tube or funnel (d) into the receptacle (e). This funnel (d) is also provided with a valve (x), preferably a slide valve, which serves to shut off the air, when the burning or reburning is to be stopped or discontinued for a longer or a shorter time. This funnel (d) may also be provided with a screw conveyor as before described. In this case the said screw serves to provide an easy and forced mechanical discharge, while the screw blades also prevent the steam vapor caused by the dropping of the hot material into the water contained in the collector (e)— provided water is used—from rising into the lower burning retort (c).

The burning or reburning proper of the treated material in the tubes or retorts (b and c) is carried out practically under exclusion of air. The burning or reburning may, however, also take place in the presence of indifferent gases as for instance $CO_2$ and the like, when materials containing carbon or carbonaceous matter or other oxidizable matter are treated, the idea being then the prevention, as much as possible, of the oxidation of carbon or carbonaceous matter of the treated material if such oxidation is undesirable.

Small air leaks do not do much harm, but, as a matter of fact, have sometimes the advantage of assisting in burning away such organic matter as is present in the material under treatment and has to be removed.

If the material to be burned or reburned is not a carbon or charcoal or animal char, or does not contain carbonaceous matter, or is non-oxidizable, as for instance kieselguhr, fuller's earth, etc., prevention of air leaks is not only without advantage, but in such case the presence of air may even be of great advantage.

The number of drying conveyors and the number of burning tubes or retorts are not restricted, nor limited to the use of respectively one and two as are represented in the constructional arrangement shown in the appended drawing. The sectional view shown in Fig. 2 represents one drying conveyor (a), feeding two sets of two retorts (b and c).

Two or more drying conveyors may be suitably arranged and connected under and next to each other, and also two or more burning tubes may be suitably placed and connected under and next to each other. With such arrangements the capacity of the kiln is enlarged and drying and burning is done more properly. The proper burning and reburning lies in properly drying and properly burning the material, and this depends upon the temperature applied, and upon the length of time of the drying and burning or reburning. The longer the way the material to be treated has to run, that is, the longer the time it is exposed to the applied heat in order to be dried and burned or reburned, the better is the result.

Two or more condensers may also be used with advantage either simultaneously or separately, that is intermittently, so as to be able to disconnect one for cleaning purposes, while still using the other or others, and thus not interrupt the continuous operation.

When cleaning out the inside of the condenser the material thus removed may be brought directly into the drying conveyor (a). The paste discharged from the condenser into the receptacle (l) is as a rule too thin and contains too much moisture to be brought directly into the conveyor (a). This thin paste must be, previous to the drying in the conveyor (a) freed from most of its moisture in some suitable way, as for instance by a filter press or the like.

The condenser (g) or the pipes (n) or the retorts (b and c) may be provided with means (indicated by o at one of the pipes n in Fig. 2, and by o' at one of the retorts b in Fig. 1) to inject a fine spray of water, steam or other condensible vapors or gases, to assist in the precipitation of the material suspended in the gases and vapors developed during and by the drying and burning process or otherwise carried away.

The heating of the conveyor (a) for drying the material and the heating of the burning tubes (b and c) for burning the material under treatment may be effected in any suitable way, using any suitable fuel and either direct or indirect heat.

In the mode of execution as represented in the appended drawing and apparatus is shown with indirect heating of the treated material by heating the burning retorts by means of a coal-fire burned on an iron grate (p). The hot gases of this coal-fire, which have been first used for heating the burning retorts (b and c) may, prior to their escape into the open air through the chimney (k) be utililized for the preliminary drying of the material which is to be submitted to the subsequent burning.

The condensation of the condensible part of the gases and vapors developed during the drying and burning process may also take place by leading the said gases and vapors in any suitable way through any suitable liquid, for instance water.

A condenser as shown in Fig. 3 may for instance be used to accomplish the above purpose, the gas outlets (n) of Figs. 1 and 2 leading to the gas inlet B of this condenser.

The particles of the finely divided material contained in the said gases and vapors are then carried down by the particular liquid used and may be recovered by any suitable means, for instance, by using a suitable filter, filter press, centrifugal separator or subsiding tank and the like.

In the annexed drawing (Fig. 3) D represents the condenser, A the inlet of cold water or other liquids, B the inlet of gases and vapors developed by and during the drying and burning process and conveyed to said inlet from the pipe (n). C represents the various conical baffle plates which serve for intimately mixing the said liquids with the said gases and vapors.

E represents the outlet for the mixture of the said liquids with the said gases and vapors and with the solids suspended therein. F represents the outlet for the non-condensible gases and vapors.

The drying shoot (a) and the burning retorts (b and c) may be suitably imbedded in a setting, for instance as shown in Figs. 1 and 2.

What I claim as my invention, and desire to secure by Letters Patent is:—

1. The process of treating finely divided materials, containing uncarbonized organic matter, such as spent decolorizing carbon which consists in heating such material, in a plurality of stages, at successively increasing temperatures, collecting and removing from the bulk of the material during such treatment, while the material is kept in motion, gaseous matter developed therefrom and laden with particles of such finely divided material, bringing together the gaseous matter from all the stages, precipitating by condensation from said gaseous matter moisture contained therein and thereby separating the particles of finely divided material suspended in said gaseous matter.

2. The process of treating finely divided carbonaceous material containing uncarbonized organic matter, such as spent decolorizing carbon, which consists in first drying such material under exposure to air and under constant agitation, then, without interrupting its agitation, heating said material, in a plurality of stages, at successively increasing temperatures, under practical exclusion of air, collecting and removing, from the bulk of the material during such heating, while the material is kept in motion, gaseous matter developed therefrom and laden with particles of such finely-divided material, bringing together the gaseous matter from all the stages, precipitating condensation from said gaseous matter moisture contained therein and thereby separating the particles of finely-divided material suspended in said gaseous matter.

In testimony whereof, I have signed my name to this specification in the presence of two subscribing witnesses.

Dr. ABRAHAM WIJNBERG.

Witnesses:
D. Kleyn,
M. Alvarado.